US011974515B2

(12) United States Patent
Leeb

(10) Patent No.: US 11,974,515 B2
(45) Date of Patent: May 7, 2024

(54) AGRICULTURAL MACHINE WITH SYSTEM FOR CALCULATING A TERRAIN RELIEF AND METHOD FOR OPERATING AN AGRICULTURAL MACHINE

(71) Applicant: HORSCH LEEB Application Systems GmbH, Landau an der Isar (DE)

(72) Inventor: Theodor Leeb, Landau an der Isar (DE)

(73) Assignee: HORSCH LEEB Application Systems GmbH, Landau an der Isar (DE)

( * ) Notice: Subject to any disclaimer, the term of this patent is extended or adjusted under 35 U.S.C. 154(b) by 792 days.

(21) Appl. No.: 17/080,267

(22) Filed: Oct. 26, 2020

(65) Prior Publication Data
US 2021/0168989 A1 Jun. 10, 2021

(30) Foreign Application Priority Data
Oct. 29, 2019 (DE) .......................... 102019129205.0

(51) Int. Cl.
*A01B 63/02* (2006.01)
*A01B 63/10* (2006.01)
(Continued)

(52) U.S. Cl.
CPC .......... *A01B 63/023* (2013.01); *A01B 63/10* (2013.01); *A01B 63/12* (2013.01); *A01B 69/00* (2013.01);
(Continued)

(58) Field of Classification Search
CPC ....... A01B 63/023; A01B 63/10; A01B 63/12; A01B 69/00; A01B 79/005; A01C 15/005;
(Continued)

(56) References Cited

U.S. PATENT DOCUMENTS 6,389,785 B1 * 5/2002 Diekhans ............. A01B 69/008
172/4.5
8,583,315 B2 11/2013 Whitehead et al.
(Continued)

FOREIGN PATENT DOCUMENTS

EP 2559332 A1 2/2013
WO 2015067804 A1 5/2015

*Primary Examiner* — Christian Chace
*Assistant Examiner* — Nicholas Stryker
(74) *Attorney, Agent, or Firm* — AVEK IP, LLC; Mark C. Young

(57) ABSTRACT

An agricultural machine, in particular self-propelled and/or towed agricultural machine and methods for proactively controlling an agricultural machine to maintain a positioning of a boom coupled to the machine over uneven terrain are described. The agricultural machine includes a chassis that bears components of the agricultural machine, a data processing apparatus, a sensor unit for detecting an inclination angle of the chassis relative to a reference plane, and a detection apparatus for detecting a travel speed and/or a travelled route, per time unit. Proactive control of the machine is achieved using the data processing apparatus which is configured to calculate a travelled route, in particular per time unit, using a travel speed and/or to calculate a terrain relief using a travelled route, per time unit, and using an inclination angle of the chassis which changes or remains constant along the route.

26 Claims, 9 Drawing Sheets

(51) Int. Cl.
*A01B 63/12* (2006.01)
*A01B 69/00* (2006.01)
*A01B 79/00* (2006.01)
*A01C 15/00* (2006.01)
*A01C 21/00* (2006.01)
*A01C 23/00* (2006.01)
*A01M 7/00* (2006.01)

(52) U.S. Cl.
CPC .......... *A01B 79/005* (2013.01); *A01C 15/005* (2013.01); *A01C 21/00* (2013.01); *A01C 23/008* (2013.01); *A01M 7/0042* (2013.01); *A01M 7/0057* (2013.01); *A01M 7/0089* (2013.01)

(58) Field of Classification Search
CPC .... A01C 21/00; A01C 23/008; A01M 7/0042; A01M 7/0089; A01M 7/0057
See application file for complete search history.

(56) References Cited

U.S. PATENT DOCUMENTS

| | | |
|---|---|---|
| 8,942,893 B2 | 1/2015 | Rosa et al. |
| 2011/0054729 A1* | 3/2011 | Whitehead .............. G01S 19/14 |
| | | 701/50 |
| 2014/0074360 A1* | 3/2014 | Rosa ........................ G05D 3/12 |
| | | 701/50 |
| 2016/0010988 A1* | 1/2016 | Bando ...................... B60P 1/04 |
| | | 701/34.4 |
| 2018/0027727 A1 | 2/2018 | Leeb |
| 2019/0126912 A1* | 5/2019 | Peterson ................ A01B 63/22 |
| 2020/0029484 A1* | 1/2020 | Weidenbach .......... A01B 63/24 |

* cited by examiner

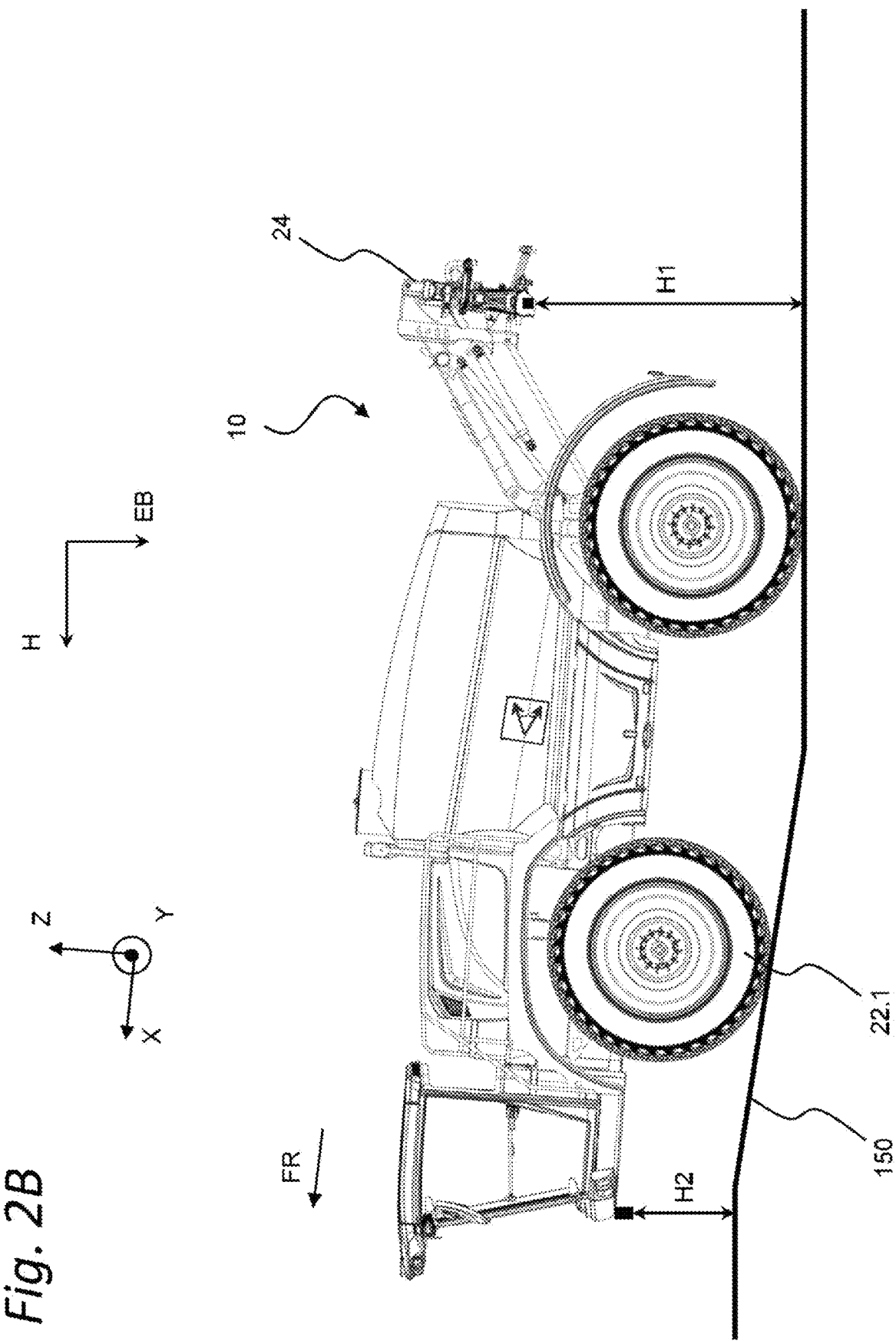

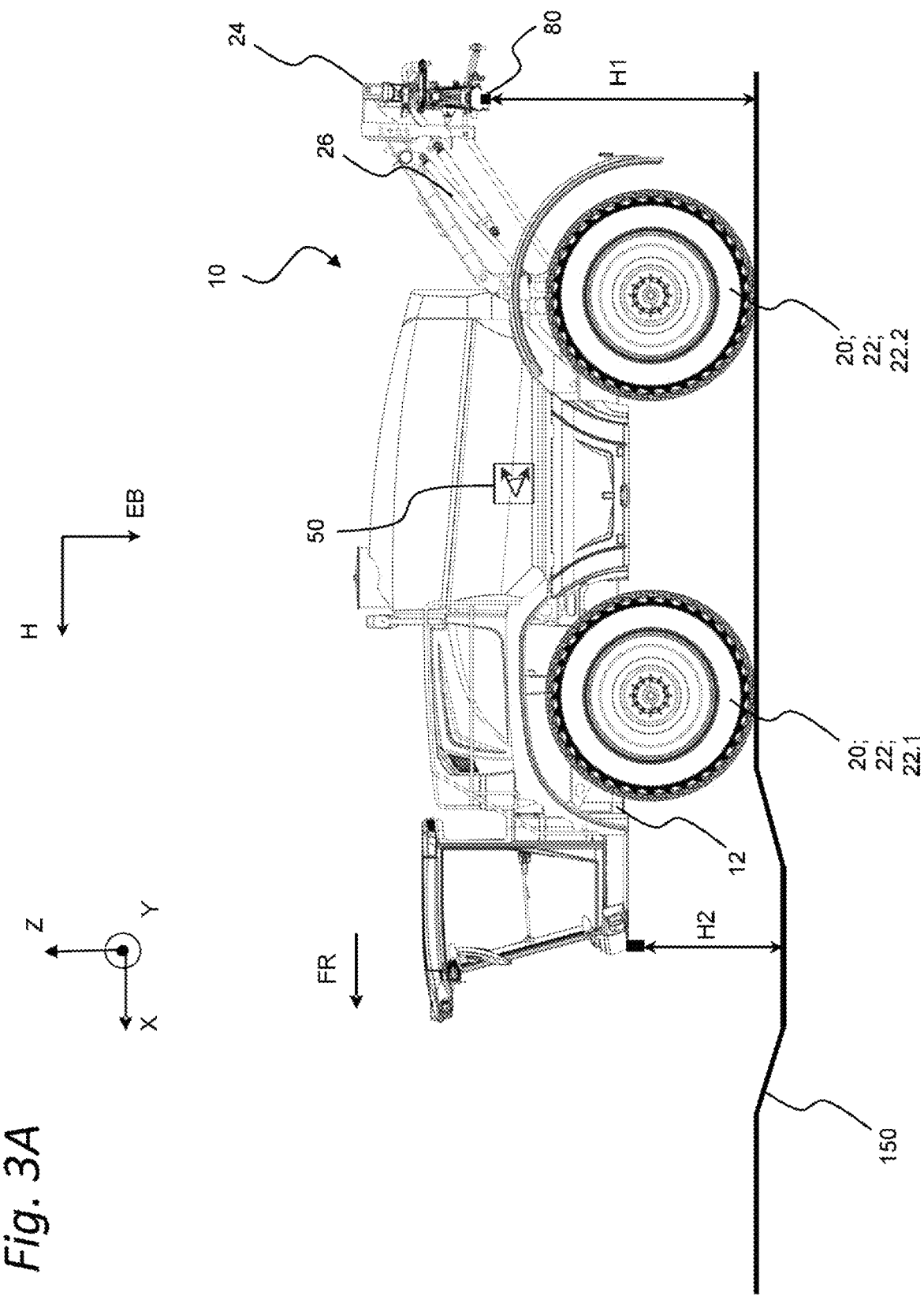

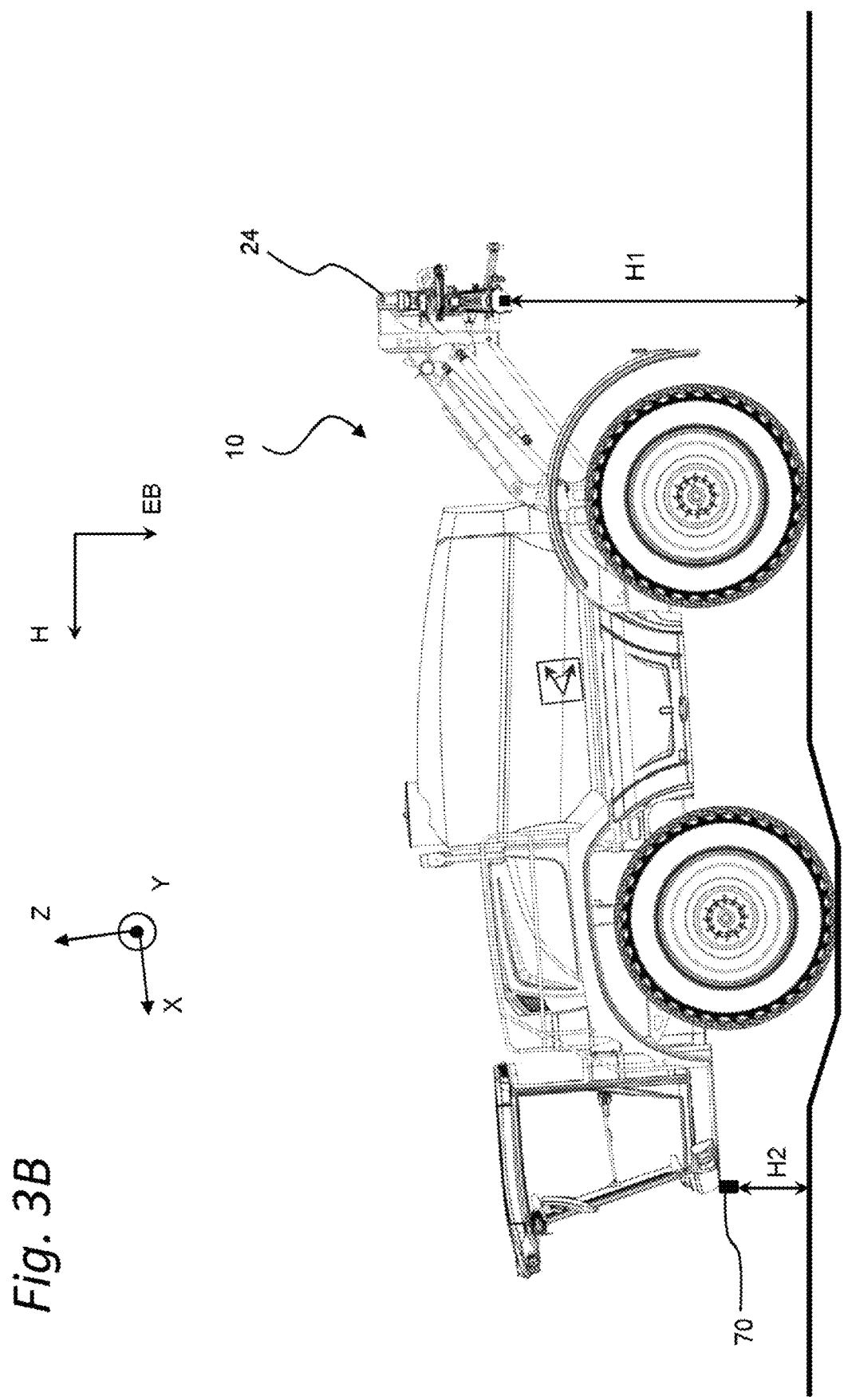

AGRICULTURAL MACHINE WITH SYSTEM FOR CALCULATING A TERRAIN RELIEF AND METHOD FOR OPERATING AN AGRICULTURAL MACHINE

CROSS-REFERENCE TO RELATED APPLICATIONS

This application claims the benefit of German Patent Application No. DE 10 2019 129 205.0, filed Oct. 29, 2019 the disclosure of which is hereby incorporated herein in its entirety by reference.

BACKGROUND

Exemplary embodiments relate to an agricultural machine, in particular a self-propelled and/or towed agricultural machine. Exemplary embodiments further relate to a method for operating an agricultural machine, in particular a method for a self-propelled and/or towed agricultural machine.

A known agricultural machine is disclosed in EP 2 559 332 A1, for example. The agricultural machine is designed as a field sprayer and comprises a distributor boom, in particular a spraying boom, a frame supported by a running gear on the ground and at least one storage container. The distributor boom is pivotable by means of a suspension device at least about a pivot axis running in the direction of travel and is suspended by means of a height adjustment apparatus in a height-adjustable manner on the frame. The distributor boom has an extent transversely to the direction of travel which corresponds to a multiple of the transport width of the distribution machine, and the suspension device has at least one damping element arranged between the distributor boom and the frame and/or at least one actuator for influencing the rotational position of the distributor boom. The damping element and/or the actuator is able to be correspondingly activated by an electronic regulating apparatus of a control and/or evaluation program stored in a memory of a regulating apparatus. Data of at least one sensor which determines operating data of the distribution machine is supplied to the regulating apparatus.

In order to be able to determine data in a simple manner so as to avoid a disadvantageous deflection of the distributor boom during cornering or during a turning procedure, according to the prior art it is provided that the sensor which determines the operating data is configured as an angular rate sensor. The damping element and/or the actuator for influencing the rotational position of the distributor boom may be activated and/or set on the basis of measurement data determined by the angular rate sensor such that the forces and movements acting on the distributor boom during cornering and a turning procedure are counteracted.

It is accordingly known from the prior art to determine movements of a vehicle, respectively of a chassis of a vehicle, by means of a sensor and on the basis of these movements to control a rotational position of a distributor boom and/or a spraying boom.

However, the systems known from the prior art detect only centrifugal accelerations of a chassis which may occur during cornering, for example, and further data are not determined. In the case of uneven agricultural surfaces such systems are not able to be used or only to a limited extent. In particular, such systems could not be used to permit a proactive control, since centrifugal accelerations may only be measured when the distributor boom is already subjected to these centrifugal accelerations.

By means of the system known from the prior art, therefore, an improved control of the rotational position of a spraying boom during cornering may be achieved but, in particular, in the case of very rugged terrain and high travel speeds it may occasionally arise that the actuator and thus the distributor boom, in particular due to the mass inertia thereof, may not be moved sufficiently rapidly, i.e. the distributor boom may not be lifted out or rotated sufficiently rapidly. Wherein this is particularly noticeable in the case of changes to the desired vertical position of the distributor boom relative to a ground surface and/or a plant population.

SUMMARY

Exemplary embodiments are defined by the claims below, not this summary. A high-level overview of various aspects thereof is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes, among other things, ways to provide an agricultural machine by means of which, even in the case of very rugged terrain and high travel speeds, an accurate control and/or regulation thereof is possible, in particular control and/or regulation of a distributor boom of the agricultural machine.

In one embodiment, an agricultural machine comprising a self-propelled and/or towed agricultural machine is described. The agricultural machine comprises at least one chassis which bears components of the agricultural machine, at least one data processing apparatus, at least one sensor unit for detecting an inclination angle of the chassis, in particular relative to a reference plane, as well as at least one detection apparatus for detecting a travel speed and/or a travelled route, in particular per time unit.

The data processing apparatus is configured to calculate a travelled route, in particular per time unit, using a travel speed and/or to calculate a terrain relief using a travelled route, in particular per time unit, and using an inclination angle of the chassis which changes or remains constant, in particular, along the route. As a result of the calculation of a terrain relief, an accurate control and/or regulation of an agricultural machine and/or of a distributor boom thereon may be achieved, even in the case of very rugged terrain and high travel speeds.

In particular, movements which are abrupt, sudden and/or the like, which are expediently transmitted by ground unevenness to a distributor boom, may be reduced. For example, such movements which are abrupt, sudden and/or the like are able to be at least substantially compensated even before the occurrence thereof by a proactive control and/or regulating system counter to these movements and based, in particular, on the terrain relief.

Exemplary embodiments may be based on the recognition that a travelled route, in particular per time unit, may be calculated using a travel speed. For example, the travelled route may be calculated with a data processing apparatus and/or a terrain relief may be calculated by means of a known travelled route, in particular per time unit, and by using an inclination angle of the chassis which changes along the route as a function of gradients, for example, relative to a reference plane. Corresponding gradients, slopes, curvatures, inclinations and/or straight sections may be calculated according to an inclination angle which changes and/or remains constant, relative to a reference plane along a route, which gradients, slopes, curvatures, inclinations and/or straight sections in succession are useable to define a terrain relief. Such gradients, slopes, curvatures, inclinations and/or straight sections may also be used individually to define a terrain relief.

In exemplary embodiments, the terrain relief corresponds, in particular, to a cross section (for example also the path of the surface) of a ground surface (for example a top surface) of an agricultural surface, in particular a continuous and/or partial cross section of the agricultural surface, in particular the ground surface. Wherein the terrain relief may be additionally calculated continuously and/or in sections in the direction of travel, alternatively or additionally the terrain relief may also be calculated transversely to the direction of travel of the agricultural machine, alternatively or additionally even three-dimensionally, i.e. the terrain relief may be calculated in the direction of travel and transversely to the direction of travel.

On the basis of the terrain relief, in particular controlling signals (for example control and/or regulating signals) may be transmitted in good time, preferably proactively to controlling apparatuses of the agricultural machine, whereby controlling movements (for example commanded by a control and/or regulating system) may be initiated in good time, in particular even before the occurrence of an event. Wherein using the movements of a chassis and the terrain relief calculated therefrom, in particular by means of the data processing apparatus, movements of components of the agricultural machine, in particular a distributor boom may be calculated (for example proactively) in advance. In other words, using the terrain relief, corresponding positional changes (for example the vertical position) of the components of the agricultural machine (for example a distributor boom) may be calculated. If, for example, the distributor boom is arranged in a rear region of the agricultural machine and the inclination of the chassis changes, an actuator may be activated proactively for changing the position (for example the vertical position and/or rotational position) of the distributor boom, whereby in each case it is possible to react in good time to variable terrain relief and, in particular, a distance (for example a minimum distance) of a distributor boom may be maintained relative to the ground surface.

The agricultural machine comprises a chassis that bears components of the agricultural machine. Wherein the chassis is formed, in particular, by the chassis frame and/or the frame of the agricultural machine, and/or comprises a chassis frame and/or the frame of the agricultural machine. In particular, the chassis forms a load-bearing part of the agricultural machine on which the chassis frame and the wheel suspensions thereof are attached, for example, as components. However, for example, also a storage container, drives, gearboxes and/or the like may be installed. The chassis may be in one piece or multiple pieces and composed of unreleasable and/or releasable connections.

According to a variant, it is possible that the sensor unit has a first sensor arrangement for detecting an inclination angle in the direction of travel, in particular relative to the reference plane. The first sensor arrangement may be configured to detect an inclination angle of the chassis which changes or remains constant along the route in the direction of travel.

According to an alternative or additional variant, the sensor unit may include a second sensor arrangement for detecting an inclination angle transversely to the direction of travel, in particular relative to the reference plane. The second sensor arrangement may be configured to detect an inclination angle of the chassis which changes or remains constant along the route transversely to the direction of travel.

Exemplary embodiments may provide that the first sensor arrangement and/or the second sensor arrangement, for determining an inclination angle (for example an inclination angle in the direction of travel and/or an inclination angle transversely to the direction of travel) of the chassis, in particular relative to the reference plane, comprises at least one inclinometer. The inclinometer may be installed on the chassis or coupled to the chassis in such a manner as to detect movements thereof (for example inclinations which change and/or remain constant).

The inclinometer may be designed as an acceleration-compensated inclinometer, whereby in particular transverse accelerations of the chassis which are produced, for example, by ground unevenness, have little or no effect on an accurate output and/or detection of an inclination angle.

The acceleration-compensated inclinometer may comprise an inclinometer, such as a gravity-type inclinometer, and a sensor that detects accelerations (for example an angular rate sensor (for example a gyroscope), accelerometer or the like). The inclinometer and the sensor which detects accelerations may have a common housing but also may respectively have separate housings and, for example, may be coupled by the data processing apparatus. Additionally or alternatively, further sensors which are configured to detect an inclination (for example a gradient) may also be used as inclinometers. Examples of such inclinometers are, amongst others, tilt meters, gradient meters, slope gauges, inclinometers and/or clinometers.

Embodiments may alternatively or additionally provide that the first sensor arrangement and/or the second sensor arrangement comprises at least one angular rate sensor (for example gyroscope, yaw rate sensor) and/or one accelerometer, for detecting a rotational speed and/or a rotational acceleration of the chassis (for example in the direction of travel and/or transversely to the direction of travel), in particular relative to the reference plane. The angular rate sensor may be fitted, in particular, to the chassis and/or coupled thereto.

Alternatively, the first sensor arrangement and the second sensor arrangement may be formed by an angular rate sensor. The angular rate sensor in this case may be configured as a 2-axis angular rate sensor or 3-axis angular rate sensor, which thus may measure rotational speeds and/or rotational accelerations relative to two axes (for example X-axis and/or Y-axis) or three axes (for example X-axis and/or Y-axis and/or Z-axis).

In exemplary embodiments it may be provided that the data processing apparatus is configured to determine or calculate, by time integration of the rotational speed and/or by time integration of the rotational acceleration, an inclination angle of the chassis (for example in the direction of travel and/or transversely to the direction of travel), in particular relative to the reference plane. The integration and/or the calculation may take place by means of a computer program stored in the data processing apparatus and/or by means of a computer unit forming a component of the data processing apparatus.

In one embodiment, the data processing apparatus may be configured to determine, in particular to calculate, an inclination angle of the chassis (for example in the direction of travel and/or transversely to the direction of travel) relative to the reference plane, by a time integration of the rotational speed carried out twice and/or by time integration of the rotational acceleration. The integration and/or the calculation may take place by means of a computer program stored in the data processing apparatus and/or may take place by means of a computer unit forming a component of the data processing apparatus. In embodiments, calculating may also encompass producing, generating and/or the like.

The data processing apparatus may include a graphical display device and/or may be signal-connected and/or able to be signal-connected to a graphical display device that is configured to display the calculated terrain relief graphically. The graphical display device may comprise, for example, a terminal, a display, a mobile terminal, a computer and/or the like.

It should be mentioned that the direction of travel defined in the present case, may correspond to a longitudinal direction of the agricultural machine and/or a forward direction of the agricultural machine.

The reference plane has, for example, an orientation which corresponds to a horizontal (for example a mathematical horizontal) and/or an artificial horizontal (for example artificial horizontal plane, mathematical horizontal or the like). The artificial horizontal plane is oriented, in particular, at right-angles to the vertical direction of the chassis. According to an alternative or additional variant, for example, the reference plane has an orientation which corresponds to an orientation of the gravitational acceleration. The reference plane may alternatively or additionally have an orientation which is at least substantially parallel to a horizontal and/or at least substantially parallel to an orientation of the gravitational acceleration. In each case the same plane may be used, i.e. applied, as a reference plane in the direction of travel and transversely to the direction of travel.

The chassis and/or the chassis frame assigned to the chassis may have one or more wheel suspensions, wherein in particular two such wheel suspensions may form an axle and wherein at least one running wheel may be assigned to each wheel suspension. The chassis frame may comprise at least one axle, in particular a first axle and/or a second axle, wherein the first axle (for example the front axle) and/or the second axle (for example the rear axle) in each case may have two running wheels. The wheel suspensions, respectively the running wheels, of at least one axle may additionally be steerable relative to the chassis. Alternatively and/or additionally, it may also be provided that the running wheels are arranged to the left and right of the chassis, wherein at least the running wheels of the first axle and/or the second axle may be vertically movable relative to the chassis. A vertical mobility may be implemented such that the running wheels are height-adjustable and/or resilient relative to the chassis in order to achieve, in particular, good handling characteristics and effective adaptation to the ground. Accordingly, a relative distance between the running wheel and the chassis may be defined as a function of the vertical mobility.

At least two running wheels may be arranged in a vertically movable manner relative to the chassis and the data processing apparatus may be configured to calculate an inclination angle and/or a terrain relief taking into account a relative distance of the running wheels relative to the chassis. For example, if the running wheels of an axle (for example of the first axle) are at a shorter relative distance from the chassis than the running wheels of a further axle (for example of the second axle) or, for example, if at least one running wheel arranged to the left adjacent to the chassis is at a different relative distance from the chassis than a running wheel arranged to the right adjacent to the chassis, the inclination of the chassis thus changes relative to a reference plane. In order to take this into account when calculating the terrain relief, the changed inclination may be correspondingly taken into account by the data processing apparatus, in particular added.

In one embodiment, the data processing apparatus may be configured to calculate an inclination angle in the direction of travel $\alpha$ and/or an inclination angle transversely to the direction of travel $\beta$ and/or a terrain relief by taking into account a relative distance of the running wheels of the first axle relative to the chassis and a relative distance of the running wheels of the second axle relative to the chassis and/or by taking into account a relative distance of the running wheels to the left relative to the chassis and a relative distance of the running wheels to the right relative to the chassis.

In one embodiment, the track width (for example the track breadth) of the running wheels of at least one axle is adjustable, preferably is adjustable by means of an actuating drive (for example a hydraulically and/or pneumatically and/or electrically operated cylinder). The data processing apparatus may be additionally configured to calculate an inclination angle (for example in the direction of travel and/or transversely to the direction of travel) and/or a terrain relief by taking into account a track width of the running wheels.

For detecting the relative distance between the running wheels and the chassis, measuring means (for example path measuring systems, distance sensors and/or the like) may be provided. For example, the running wheels, respectively the wheel suspensions, may be provided with actuators (for example a hydraulically and/or pneumatically and/or electrically operated cylinder) for vertical mobility and, for example, movements of the actuators may be correspondingly measured by the measuring means. A pressure sensor system and/or force sensor system in the actuator may also be usable. A measurement of the distance between the chassis and a ground surface may be employed, wherein in turn a relative distance may be defined using this distance. Similarly, measuring means may be provided for detecting the track width. For example, path measuring systems, distance sensors and/or the like. In one embodiment, the track width may be stored as a parameter in the data processing apparatus or stored by an operator.

In one exemplary embodiment, the agricultural machine comprises an agricultural traction machine (for example a tractor). Alternatively or additionally, the agricultural machine may be a self-propelled working machine (for example a self-propelled field sprayer, self-propelled fertilizer spreader, self-propelled harvesting machine and/or the like) or a towed working machine (for example a field sprayer, fertilizer spreader towed by means of the traction vehicle and/or installed on the traction vehicle). The agricultural machine may additionally be an individual machine or a group of machines comprised of, for example, of a traction machine and a working machine towed by means of the traction machine or installed on the traction machine.

Within the context of exemplary embodiments it is also possible that for calculating a terrain relief, inclinations (for example in the direction of travel and/or transversely to the direction of travel) of a traction machine (for example the chassis thereof) may be detected and by the data processing apparatus corresponding vertical positions and/or rotational positions of a component (for example a distributor boom) installed on a working machine, which is towed by means of the traction machine or installed on the traction machine, may be recalculated corresponding to the inclinations of the traction vehicle (for example the chassis thereof) using the vehicle geometry of the working machine which is towed by means of the traction vehicle or installed on the traction machine.

The agricultural machine may also be configured as an autonomous agricultural machine, for example as fully autonomous or semi-autonomous.

For the accurate implementation of agricultural operations, the agricultural machine may comprise components which are pivotable relative to the chassis and/or mounted in a height-adjustable manner. In particular, the agricultural machine may comprise a distributor boom, in particular a spraying boom, which is height-adjustable relative to the chassis and/or adjustable relative to the chassis in the rotational position thereof, preferably for forming a field sprayer or a fertilizer spreader.

It should be mentioned that herein, the term "spraying boom" includes such distributor booms which may extend over a large working width transversely to a direction of travel, for example which may extend up to 30 metres or more, and which are composed of a central part and side parts arranged to the left and right on the central part and pivotably thereto. The side parts may be pivotable relative to the central part, in particular for a transport journey. The spraying booms additionally may include a plurality of spreading elements (for example spray nozzles, deflector elements) at a distance from one another, for the distribution of a liquid and/or granular material.

In some embodiments, instead of a distributor boom the agricultural machine is provided with other components, for example a harvesting device which additionally may be height-adjustable relative to the chassis. The agricultural machine is preferably suitable and/or configured, in particular, for implementing agricultural operations, processes and/or the like. The agricultural machine may comprise, in particular, a distributor boom which is height-adjustable relative to the chassis and/or adjustable relative to the chassis in the rotational position thereof. Additionally, the agricultural machine comprises a first controlling apparatus for controlling and/or regulating a vertical position (for example a distance relative to a ground surface) and/or a second controlling apparatus for controlling and/or regulating a rotational position (for example a rotational position relative to a ground surface).

The first controlling apparatus and/or the second controlling apparatus may be formed, in particular, by one and/or more pneumatically and/or hydraulically and/or electrically actuatable and/or operated actuator(s) (for example a cylinder, motor, actuating drive, and/or the like). In particular, the first controlling apparatus and/or the second controlling apparatus may be formed by one or more single-acting and/or by two opposingly operating single-acting and/or one or more dual-acting cylinders. The data processing apparatus may be configured to calculate a vertical position and/or a rotational position of the distributor boom relative to the chassis and/or relative to a ground surface using at least one of a vehicle geometry of the agricultural machine, a travelled route, and/or a calculated terrain relief.

The data processing apparatus may be configured to calculate controlling signals, in particular control and/or regulating signals, for the first controlling apparatus and/or the second controlling apparatus using at least one of a vehicle geometry of the agricultural machine, a travelled route, and/or a calculated terrain relief.

The vehicle geometry may be defined, in particular, by a track width and/or an axle distance (wheelbase) and/or a reference distance of the distributor boom from a reference point on the chassis and/or a width of the distributor boom.

The vehicle geometry may also encompass dimensions of a traction machine and a working machine installed on the traction machine and/or connected thereto. In each case, a change to a vertical position or a rotational position of the distributor boom is defined by using the vehicle geometry, i.e. for example the greater the distance between the rear axle and the distributor boom, the greater the change to the vertical position or the rotational position, in the case of a variable inclination (for example in the direction of travel) of the chassis.

In one embodiment, the data processing apparatus is configured, in particular, to generate controlling signals for the first controlling apparatus and/or the second controlling apparatus using a minimum distance of the distributor boom relative to the ground surface, calculated on the basis of the terrain relief. In other words, by using a vehicle geometry, a travelled route and/or a ground relief it is possible for the data processing apparatus to define which vertical position and/or which rotational position the components, in particular the distributor boom, adopt with the current setting of the controlling apparatus. The data processing apparatus may be configured to calculate, as a function of the terrain relief and/or the vehicle geometry, a change to the vertical position or a rotational position and if a defined minimum distance from, for example, a ground surface has been dropped below or exceeded. A vertical position and/or rotational position may then be correspondingly adapted as a function of this minimum distance.

According to an exemplary embodiment, it may be provided that for detecting a minimum distance, i.e. for detecting a vertical position of the distributor boom relative to a ground surface, a fourth sensor arrangement is assigned to the distributor boom, in particular distance sensors such as for example ultrasonic sensors or the like. Wherein it may be provided that a vertical position of the distributor boom is implemented by taking into account the terrain relief and a vertical position of the distributor boom detected by means of the sensors for detecting a vertical position.

In order to calculate even more precisely, the terrain relief and in order to further improve a proactive control, the agricultural machine may include a third sensor arrangement. The third sensor arrangement is configured for detecting a chassis distance between the chassis and a ground surface (for example a terrain relief). The third sensor arrangement may be arranged upstream of the chassis, in particular arranged at a distance (for example at least 0.5 metres) upstream of the chassis. Alternatively or additionally, the third sensor arrangement may be arranged, in particular, upstream of the running wheels, i.e. arranged in the region of a travel lane of the agricultural machine.

The third sensor arrangement may be configured to detect ground unevenness in advance, in particular ground unevenness (for example gradients, inclinations, depressions, protuberances) even before a change occurs to the inclination of the chassis (for example in the direction of travel and/or transversely to the direction of travel). Which is correspondingly noticeable, when traveling through a depression or when traveling over a protuberance. The third sensor arrangement may be formed by one or more distance sensors (for example ultrasonic sensors) and/or comprise such sensors.

The detection apparatus may comprise a detection by sensor of a travel speed and/or a position-dependent detection of a travel speed. The detection apparatus may comprise speed detecting sensors or may be formed by such sensors for determining a travel speed. Examples of such speed detecting sensors are, among others, radar sensors, tachometers, revolution counters, Hall sensors and/or the like. Alternatively and/or additionally, the detecting apparatus may also be connected and/or may be connectable to a position determining system (for example GPS system, Galileo System) and, for example, determine a speed using a changing position of the agricultural machine and/or a travelled route, in particular per time unit, in particular as a function of a changing position of the agricultural machine. For detecting a travel speed and/or a travelled route, in particular per time unit, the detection apparatus may also have a separate data processing apparatus or may be coupled to such a data processing apparatus. The detection apparatus may be configured to calculate a route, per time unit. The detection apparatus may be configured, to detect a constant speed, an acceleration and/or a deceleration of the agricultural machine. Additionally, the data processing apparatus may be configured to calculate a travelled route per time unit, using a constant speed, an acceleration and/or a deceleration. The detection apparatus may also calculate an average speed from an acceleration, a deceleration and a constant speed, which average speed in turn may be used as a basis for calculating a travelled route, per time unit.

It is possible that the terrain relief which is respectively calculated is transmitted to a planning system for planning agricultural processes and may be used, for example, for planning agricultural processes. It is also conceivable that the terrain relief is transmitted to other agricultural machine(s) and/or is stored in a computer program of another agricultural machine.

The data processing apparatus may include, for example, a computer unit, an on-board computer and/or the like, and additionally comprises a control and/or regulating circuit, in particular a hydraulic and/or pneumatic and/or electrical control and/or regulating circuit. The control and/or regulating circuit is configured for hydraulic and/or pneumatic and/or electrical signal and/or command transmission. The signal and/or command transmission may be carried out wirelessly (for example by means of WLAN).

Within the context of exemplary embodiments, the term "data processing apparatus" may encompass all of the components for signal and command transmission including, for example computer units, CPUs and/or the like as well as data processing apparatuses integrated in the respective sensors or sensor units or sensor arrangements. The data processing apparatus may be configured to link the inclination angle detected by means of the first sensor arrangement and the inclination angle detected by means of the second sensor arrangement in such a manner as to generate a three-dimensional terrain relief. As such, the distances detected by means of the third sensor arrangement may also have an effect thereon.

The data processing apparatus may be configured to combine the data of the first sensor arrangement and/or the second sensor arrangement and/or the third sensor arrangement and/or the fourth sensor arrangement and to generate therefrom a terrain relief.

It should also be mentioned that the terms "control" and "regulate" and/or "control apparatus" and "regulating apparatus" may refer to electronic and/or pneumatic and/or hydraulic control systems and regulating system, which depending on the embodiment may undertake control tasks and/or regulating tasks. Also when the term "control" is used herein, equally "regulate" may also be encompassed thereby. Similarly, when using the term "regulate", equally a "control" may also be encompassed thereby.

Within the context of exemplary embodiments, the reference point may correspond to any position, in particular on the chassis. For example, a running wheel or an axle may also be used as the reference point. When in the present case a reference point is referred to, this applies by way of example to a reference point of the chassis for defining distances, dimensions and/or the like.

Exemplary embodiments additionally comprise methods for operating an agricultural machine, in particular for a self-propelled and/or towed agricultural machine. In one embodiment, the method comprises a calculation of a terrain relief by means of a data processing apparatus, using an inclination angle of a chassis of the agricultural machine which is detected by means of a sensor unit and which changes or remains constant along a route, in particular relative to a reference plane and using a travelled route.

The agricultural machine may include a distributor boom which is adjustable relative to the chassis in the vertical position thereof and/or in the rotational position thereof. A first controlling apparatus is provided for controlling and/or regulating a vertical position of the distributor boom and/or wherein a second controlling apparatus is provided for controlling and/or regulating a rotational position of the distributor boom and wherein the data processing apparatus is configured to calculate, in particular, control and/or regulating signals for the first controlling apparatus and/or the second controlling apparatus using at least one of a vehicle geometry of the agricultural machine, a travelled route, in particular per time unit, and/or a calculated terrain relief.

DESCRIPTION OF THE DRAWINGS

The above-described preferred embodiments and features of exemplary embodiments are able to be combined together in any manner. Further details and advantages of exemplary embodiments are described hereinafter with reference to the accompanying drawings. The size ratios of the individual elements to one another do not always correspond in the figures to the actual size ratios, since some shapes are simplified and other shapes are shown enlarged relative to other elements for greater clarity. Illustrative embodiments are described in detail below with reference to the attached drawing figures, and wherein:

FIG. 2B is a side view of the agricultural machine according to FIG. 2A which is moved along a gradient in the ground surface and depicted in accordance with an exemplary embodiment;

FIG. 3A is a side view of an agricultural machine which is moved on a flat ground surface toward a depression depicted in accordance with an exemplary embodiment;

FIG. 3B is a side view of the agricultural machine according to FIG. 3A which is located with a first axle in a depression and with a second axle on a flat ground surface depicted in accordance with an exemplary embodiment;

DETAILED DESCRIPTION

Figure 1A:
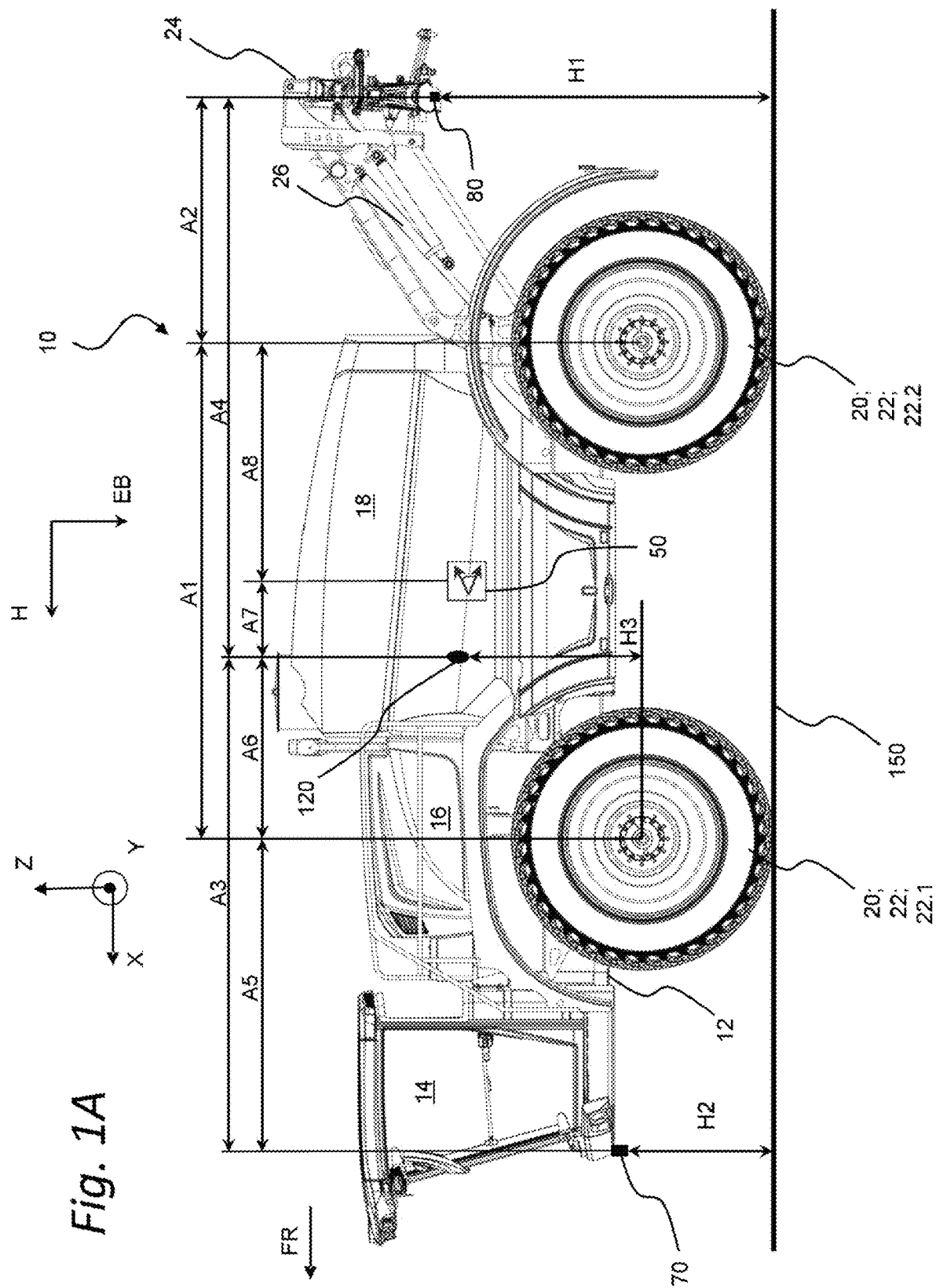
FIG. 1A is a side view of an agricultural machine, which is moved along a flat ground surface, with a distributor boom which is adjustable in the vertical position and the rotational position thereof depicted in accordance with an exemplary embodiment.

The subject matter of select exemplary embodiments is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" or "substantially" as used herein denote deviations from the exact value by +/−10%, preferably by +/−5% and/or deviations in the form of changes that are insignificant to the function.

The embodiments shown in FIGS. 1 to 6 at least partially coincide, so that similar or identical parts are provided with the same reference numerals and for the description thereof reference is also made to the description of the other embodiments and/or figures in order to avoid repetition. The embodiments which are shown are exemplary and are not intended to limit embodiments described herein.

Figure 1B:
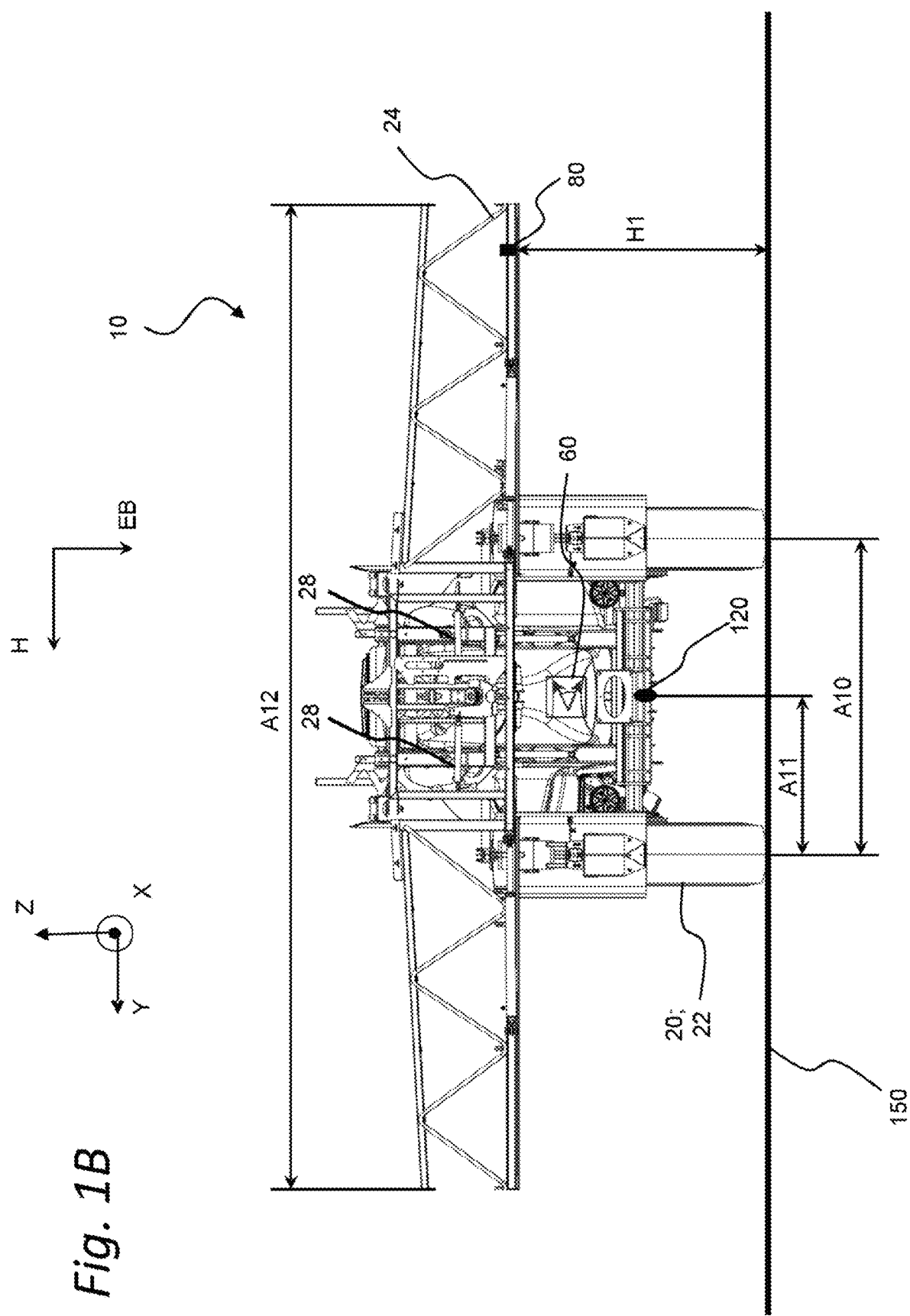
FIG. 1B is a view from the rear of an agricultural machine according to FIG. 1A.

In one embodiment, an agricultural machine 10 is shown in the side view of FIG. 1A and in the view from the rear according to FIG. 1B. The agricultural machine 10 is designed as a self-propelled agricultural machine 10 and comprises a chassis 12 for bearing the components of the agricultural machine 10. The agricultural machine 10 additionally has a cab 14 in which, for example, an operating area for an operator may be present, the agricultural machine 10 additionally comprises an engine unit 16 for driving said agricultural machine 10.

The agricultural machine 10 is configured as a self-propelled working machine in the form of a distribution machine, in particular in the form of a field sprayer, in order to be able to distribute, in particular, liquid spraying agent by means of the agricultural machine 10. For carrying and providing the spraying agent respectively to be distributed, the agricultural machine 10 additionally comprises a storage container 18. The cab 14, the engine unit 16 and the storage container 18 which are borne by a chassis 12.

A chassis frame is also assigned to the chassis 12 and/or the chassis 12 comprises a chassis frame. Wherein the chassis frame in each case comprises running wheels 20 rolling along a ground surface (for example a terrain relief 150). The agricultural machine 10 according to FIGS. 1A and 1B additionally comprises a first axle 22 (for example a front axle 22.1) and a second axle 22 (for example a rear axle 22.2).

The chassis frame according to an exemplary embodiment has wheel suspensions, wherein in each case two such wheel suspensions form an axle 22, wherein to this end each wheel suspension is assigned in each case a running wheel 20. The wheel suspensions at least of the front axle 22.1 may be additionally steerable, in particular, relative to the chassis 12. The running wheels 20 are additionally arranged in each case to the left and right of the chassis 12.

Additionally the running wheels 20 of the front axle 22.1 and/or rear axle 22.2 are arranged in a vertically movable manner relative to the chassis 12, such that a relative distance H3 of the running wheels 20 to the chassis 12 and/or to a reference point 120 on the chassis 12 is able to be defined. The vertical mobility a chassis distance H2 of the chassis 12 relative to a ground surface may also be changed and, for example, a minimum distance H1 of a distributor boom 24 arranged on the chassis 12 is also changed therewith and/or may be changed therewith. The running wheels 20 of the two axles 22 are arranged at an axle distance A1. Additionally, the running wheels 20 of one axle have a track width A10 as well as at least an eleventh distance A11 from the reference point 120 defined on the agricultural machine 10.

The agricultural machine 10 is moved along a terrain relief 150 (for example a ground surface), wherein the cab 14 is arranged according to the direction of travel FR at the front on the chassis 12. The direction of travel FR corresponds according to FIG. 1A, relative to a Cartesian coordinate system, to an orientation of the X-axis and/or X-direction. Wherein an orientation transversely to the direction of travel, relative to a Cartesian coordinate system, corresponds to an orientation of the Y-axis (see also FIG. 1B). Accordingly, a Z-axis has in each case a vertical orientation.

Figure 4A:
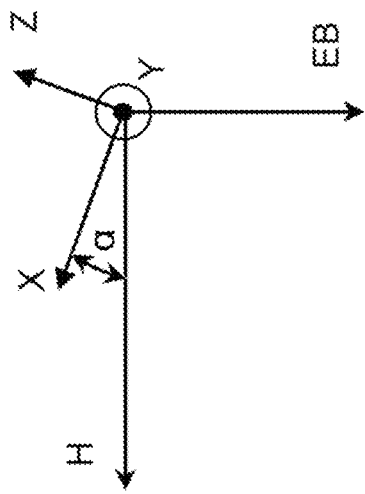
FIG. 4A is a schematic sketch in which the orientations of the X-, Y-, Z-axis and the horizontal and the gravitational acceleration are shown, in the case of an agricultural machine which is moved in the direction of travel along a flat ground surface depicted in accordance with an exemplary embodiment.
Figure 5A:
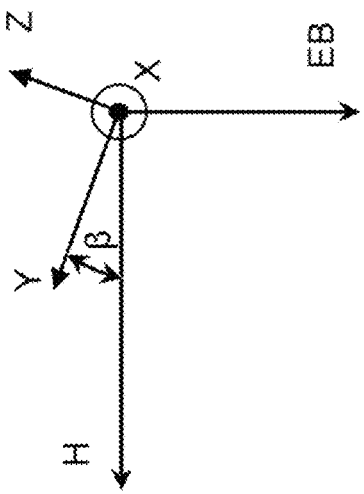
FIG. 5A is a schematic sketch in which the orientations of the X-, Y-, Z-axis and the horizontal and the gravitational acceleration are shown, in the case of an agricultural machine which is not inclined transversely to the direction of travel depicted in accordance with an exemplary embodiment.

Since the agricultural machine 10 according to FIG. 1 is moved on a plane, a horizontal H is parallel to the X-axis and an orientation of the gravitational acceleration EB is parallel to the Z-axis and at right-angles to the X-axis. In particular, this means that the agricultural machine 10 is moved at a constant inclination which in turn may be determined in the direction of travel FR by means of first sensor arrangement 50 which may comprise at least one inclinometer, and transversely to the direction of travel FR by means of a second sensor arrangement 60 which may comprise at least one inclinometer, wherein these relationships are also shown in FIGS. 4A and 5A.

According to one embodiment, using the first sensor arrangement 50 and/or the second sensor arrangement 60 a constant or changing inclination angle (for example an inclination angle in the direction of travel $\alpha$ and/or an inclination angle transversely to the direction of travel $\beta$) of the chassis 12 may be determined relative to a reference plane. For example, a horizontal H and/or an orientation of the gravitational acceleration EB may be used as the reference plane.

For distributing spraying agent the agricultural machine 10 comprises a distributor boom 24, in particular a spraying boom, that extends transversely to the direction of travel FR in a large working width and/or distributor boom width A12. The distributor boom 24, respectively the spraying boom, may comprise central part and side parts arranged pivotably to the left and right on the central part. The distributor boom 24 may, for example, have a width of 20 metres or 30 metres or more. Distribution elements (for example spreading elements such as spray nozzles, deflector elements and/or the like) may also be attached to the distributor boom, the spraying agent in each case being distributed thereby, in particular, in a fan-like manner, wherein the distribution elements are additionally operatively connected and/or operatively connectable to the storage container.

The distributor boom 24 is height-adjustable relative to the chassis 12 and/or adjustable relative to the chassis 12 in the rotational position thereof. A first controlling apparatus 26 is provided for controlling and/or regulating the vertical position and/or a second controlling apparatus 28 is provided for controlling and/or regulating a rotational position. According to FIG. 1, the first controlling apparatus 26 is formed by a dual-acting actuator and the second controlling apparatus 28 is formed by two opposingly operating single-acting actuators. The actuators may be pneumatically and/or hydraulically and/or electrically actuatable and/or operated actuators.

The agricultural machine 10, comprises a data processing apparatus 30 (see FIG. 6) which is configured to calculate a vertical position and/or a rotational position of the distributor boom 24 relative to the chassis 12 and/or relative to a ground surface (for example a terrain relief 150). This calculation may be carried out, for example, using a vehicle geometry of the agricultural machine 10 and/or using a travelled route and/or using a calculated terrain relief 150. The vehicle geometry may in this case be defined, for example, by very different distances, according to the exemplary embodiment of FIG. 1, in particular according to at least one of the following:

an axle distance A1; and/or a second distance A2 which, for example, is present between a rear axle 22.2 and the distributor boom 24 and/or the fourth sensor arrangement 80, and/or a third distance A3 which, for example, is present between the positioning of the third sensor arrangement 70 and the reference point 120, and/or a reference distance A4 which, for example, is present between the reference point 120 and the distributor boom 24 and/or the fourth sensor arrangement 80, and/or a fifth distance A5 which, for example, is present between the front axle 22.1 and the positioning of the third sensor arrangement 70, and/or a sixth distance A6 which, for example, is present between the front axle 22.1 and the reference point 120, and/or a seventh distance A7 which, for example, is present between the reference point 120 and the position of the first sensor arrangement 50, and/or an eighth distance A8 which, for example, is present between the position of the first sensor arrangement 50 and the rear axle 22.2, and/or a track width A10 and/or an eleventh distance A11 which, for example, is present between a running wheel 20 and the reference point 120, and/or a distributor boom width A12.

The respective distances may also be correspondingly added or correspondingly subtracted, which may be carried out for example, by means of the data processing apparatus 30. It is also possible that the data processing apparatus 30 is configured to calculate controlling signals (for example control and/or regulating signals) for the first controlling apparatus 26 and/or the second controlling apparatus 28, wherein this may be carried out using a vehicle geometry of the agricultural machine 10 and/or using a travelled route, in particular per time unit, and/or using a calculated terrain relief 150.

For detecting a minimum distance H1, i.e. for detecting a vertical position of the distributor boom 24 relative to a ground surface, a fourth sensor arrangement 80 is assigned to the distributor boom 24.

In order to calculate even more precisely the terrain relief 150 and to improve even further a proactive control, a third sensor arrangement 70 may be provided. The third sensor arrangement 70 is configured for detecting a chassis distance H2 between the chassis 12 and a ground surface (for example a terrain relief 150). The third sensor arrangement 70 may additionally be arranged upstream of the chassis, upstream of the running wheels 20, and/or upstream of the travel lanes thereof. The third sensor arrangement 70 may be configured to detect in advance ground unevenness, in particular ground unevenness (for example gradients, inclinations, depressions, protuberances) even before a change occurs to the inclination (for example in the direction of travel FR and/or transversely to the direction of travel FR) of the chassis 12 (see FIGS. 2A and 2B as well as 3A, 3B and 3C).

The data processing apparatus 30 may be configured to calculate an inclination angle in the direction of travel ($\alpha$) and/or an inclination angle transversely to the direction of travel ($\beta$) and/or a terrain relief 150 by taking into account a relative distance H3 of the running wheels 20 of the first axle relative to the chassis 12 and a relative distance H3 of the running wheels 20 of the second axle relative to the chassis 12 and/or by taking into account a relative distance H3 of the running wheels 20 to the left relative to the chassis 12 and a relative distance H3 of the running wheels 20 to the right relative to the chassis 12.

Figure 2A:
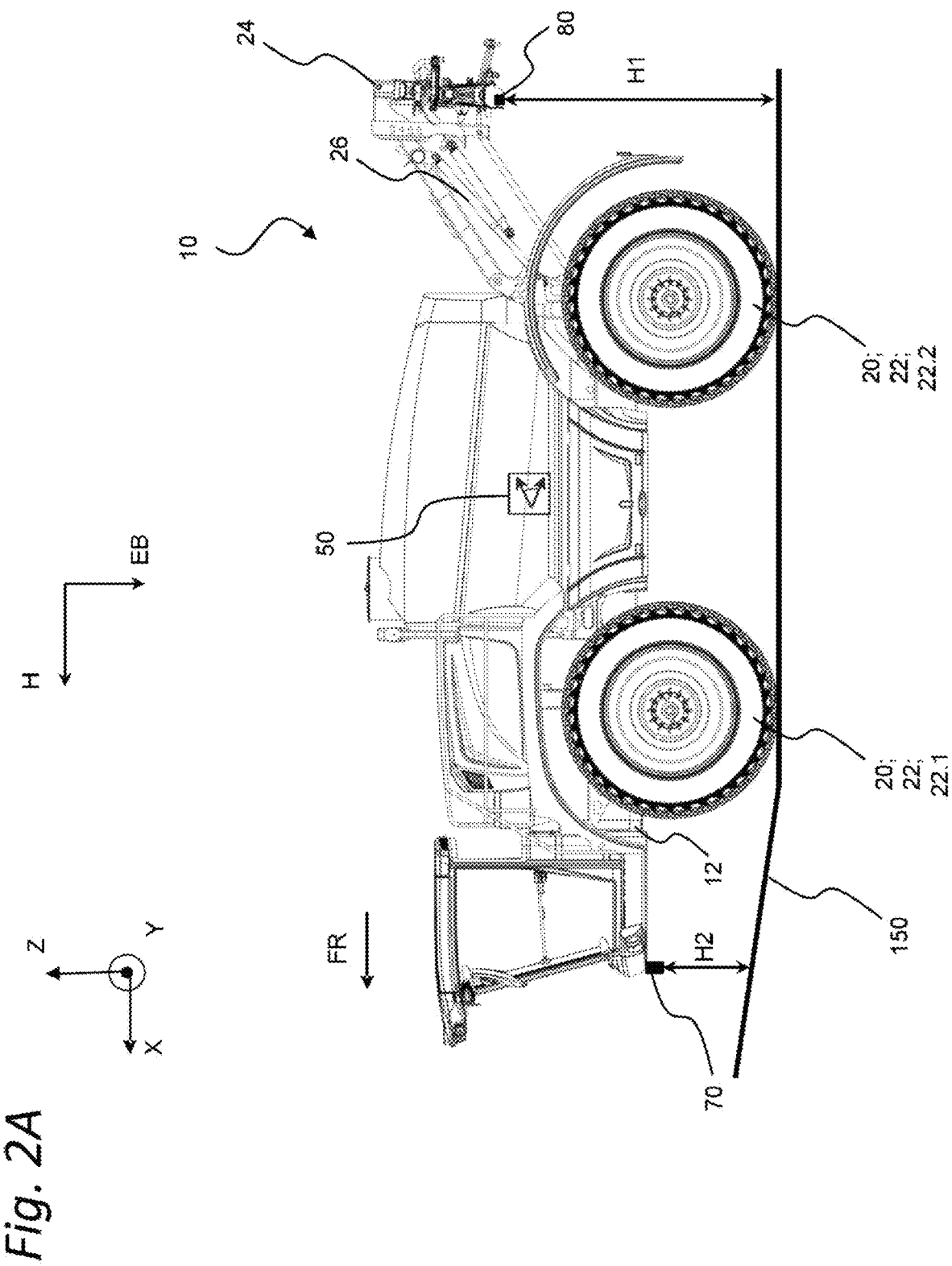
FIG. 2A is a side view of an agricultural machine which is moved on a flat ground surface in the direction of a gradient depicted in accordance with an exemplary embodiment.

Further details are shown in the side views 2A and 2B, which in each case comprise a variant of an agricultural machine 10 according to FIG. 1, which is why reference is also made to the description relative to FIGS. 1A and 1B. According to FIG. 2A the agricultural machine 10 is initially moved along a flat terrain relief 150 in the direction of a gradient and according to FIG. 2B the agricultural machine is moved with the front axle 22.1 along the gradient. As is shown in FIGS. 2A and 2B, the inclination of the chassis 12 also changes as a function of the terrain relief 150, which according to FIG. 2B is shown by a correspondingly changed orientation of the X-axis and the Z-axis relative to FIG. 2A, which according to FIG. 2B are additionally at an angle to the horizontal H and the orientation of the gravitational acceleration EB. These relationships are additionally shown in FIGS. 4A and 4B in more detail. Wherein the relationships according to FIG. 2A correspond to FIG. 4B and wherein the relationships according to FIG. 2B correspond to FIG. 4B. As is shown in FIG. 4B, the chassis 12 has an inclination angle in the direction of travel α relative to the horizontal H.

As a function of travel on a flat ground surface (for example a terrain relief 150) or a gradient, correspondingly the minimum distance H1 of the distributor boom 24 also changes relative to the terrain relief 150 as well as the chassis distance H2 relative to the terrain relief 150. It may be provided that as a function of the terrain relief 150 the first controlling apparatus 26 is able to be controlled and/or regulated by means of the data processing apparatus 30 so as to keep at least substantially constant at least the minimum distance H1 of the distributor boom 24 relative to the terrain relief 150.

Figure 3C:
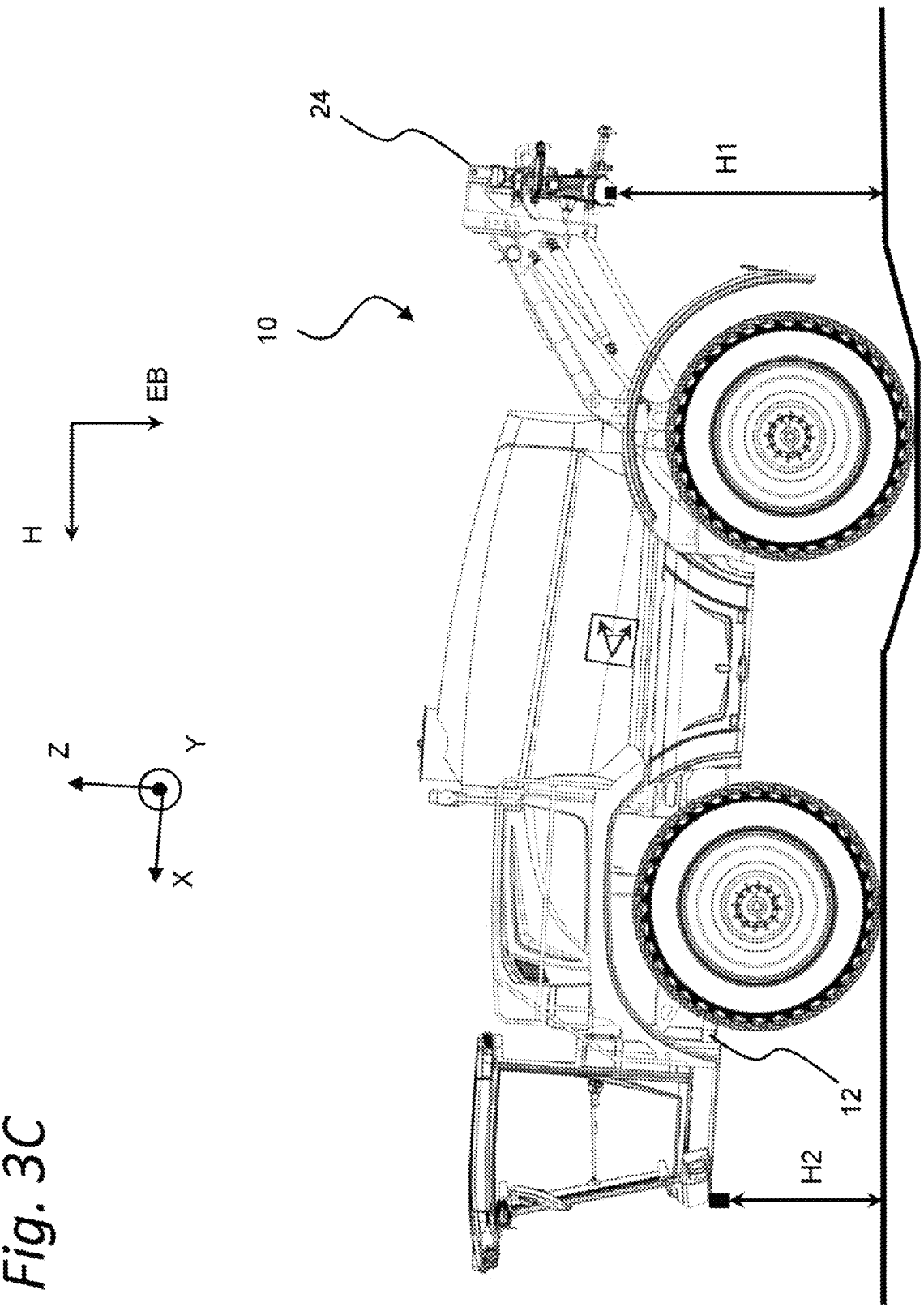
FIG. 3C is a side view of the agricultural machine according to FIGS. 3A and 3B which is located with a second axle in a depression and with a first axle on a flat ground surface depicted in accordance with an exemplary embodiment.

These relationships are also shown in FIGS. 3A, 3B and 3C in further detail. In this case an agricultural machine 10 according to FIG. 1 is moved along different terrain reliefs 150, which is also why reference is made to the description relative to FIGS. 1A and 1B. The chassis 12 correspondingly has in each case different inclinations, wherein in turn the minimum distance H1 and the chassis distance H2 in each case change but the data processing apparatus 30 and the second controlling apparatus 26 is able to be controlled and/or regulated in such a manner as to keep a minimum distance H1 at least substantially constant.

Figure 4B:
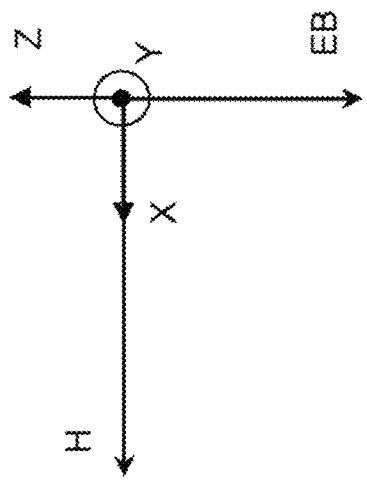
FIG. 4B is a schematic sketch in which the orientations of the X-, Y-, Z-axis and the horizontal and the gravitational acceleration are shown, in the case of an agricultural vehicle which is moved in the direction of travel at least with one axle along a gradient, whereby the chassis has an inclination angle in the direction of travel depicted in accordance with an exemplary embodiment.

Further relationships of a uniform inclination of a chassis 12 in the direction of travel FR are shown in FIG. 4A and a changing inclination of a chassis in the direction of travel are shown in FIG. 4B. Thus according to FIG. 4A the X-axis and accordingly the chassis have an identical orientation to a horizontal H and/or the Z-axis has an identical orientation to the orientation of the gravitational acceleration EB. Correspondingly, according to FIG. 4B the X-axis and thus the chassis 12 have an inclination angle in the direction of travel α relative to the horizontal H.

Figure 5B:
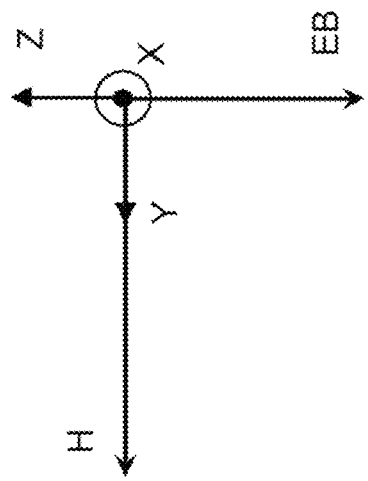
FIG. 5B is a schematic sketch in which the orientations of the X-, Y-, Z-axis and the horizontal and the gravitational acceleration are shown, in the case of an agricultural machine which is inclined transversely to the direction of travel at an inclination angle depicted in accordance with an exemplary embodiment.

Further relationships of a constant inclination of a chassis 12 transversely to the direction of travel FR are shown in FIG. 5A and a changing inclination of a chassis transversely to the direction of travel are shown in FIG. 5B. Thus according to FIG. 5A the Y-axis and accordingly the chassis have an identical orientation to a horizontal H and/or the Z-axis has an identical orientation to the orientation of the gravitational acceleration EB and the Y-axis has a vertical alignment (for example at right-angles) to the orientation of the gravitational acceleration EB. Correspondingly, according to FIG. 5B, the Y-axis and thus the chassis have an inclination angle transversely to the direction of travel β relative to the horizontal H.

Figure 6:
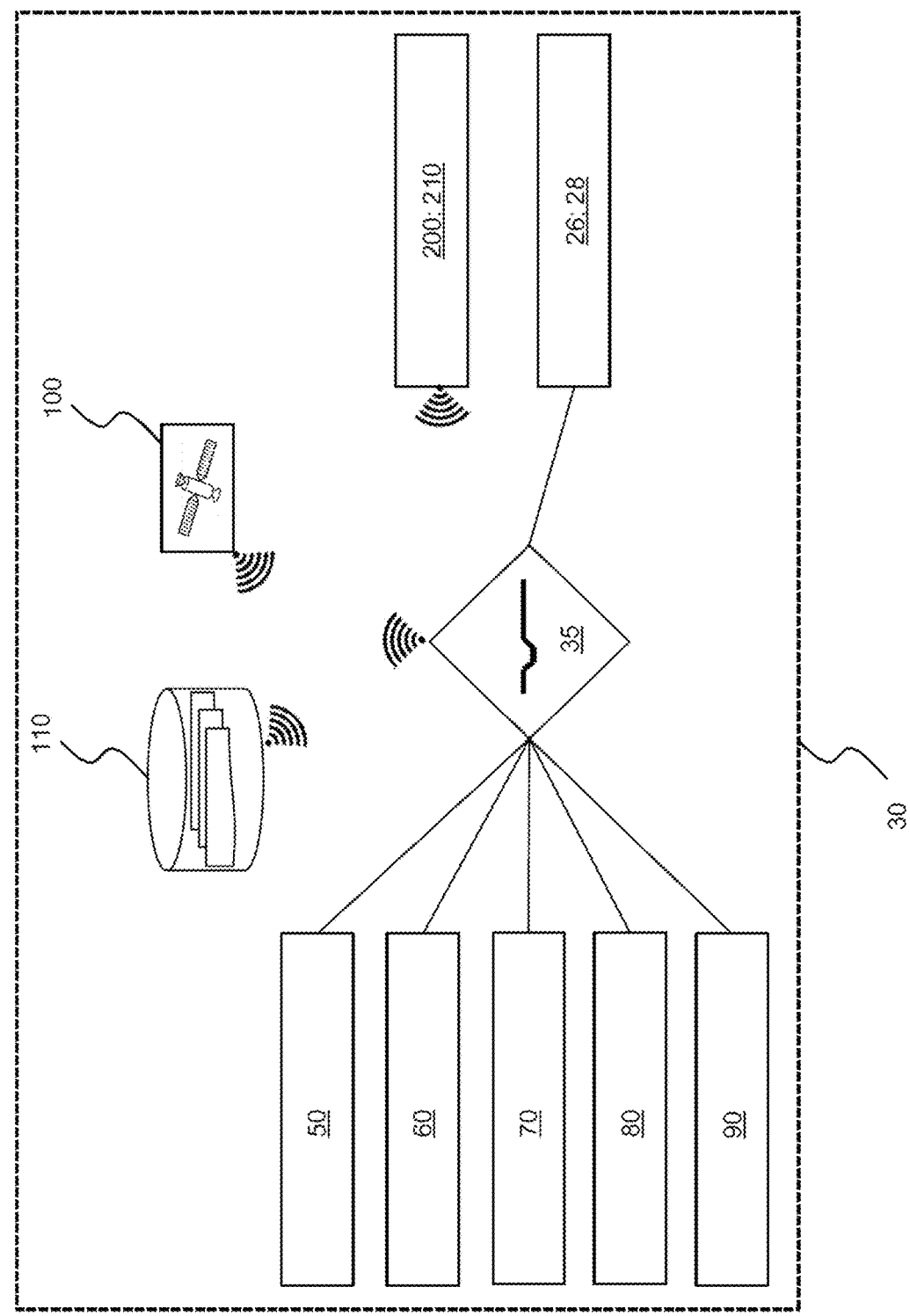
FIG. 6 is a simplified block diagram of a data processing apparatus depicted in accordance with an exemplary embodiment.

Further details of a variant of a data processing apparatus 30 are shown in the block diagram in FIG. 6. As is shown in FIG. 6, the data processing apparatus 30 comprises all of the components for the signal and/or command transmission. Accordingly also at least one computer unit 35.

The data processing apparatus 30 is at least signal-connected and/or able to be signal-connected (for example in a wireless and/or wired manner) to the first sensor arrangement 50, to the second sensor arrangement 60, the third sensor arrangement 70, the fourth sensor arrangement 80 and to the detection apparatus 90. However further elements for the signal transmission might be used.

Moreover, the data processing apparatus 30 and/or the computer unit 35 may be data-connected to a position determining system 100 and/or to a data store 110, in order to transmit, for example, a terrain relief 150 to the data store 110 and/or in order to receive data for calculating the terrain relief 150 from the data store 110. Moreover, a position determining system 100 (for example a GPS system) may be provided, therefore, in order to determine, for example, a travel speed and/or to determine a travelled route, per time unit. The position determining system 100 could accordingly also form the detection apparatus 90.

The data processing apparatus 30 may be configured to combine the data of the first sensor arrangement 50 and/or the second sensor arrangement 60 and/or the third sensor arrangement 70 and/or the fourth sensor arrangement 80 and to generate and/or to calculate therefrom a terrain relief 150. The respectively calculated terrain relief 150 may be transmitted to a planning system 200 for planning agricultural processes and may be used, for example, for planning agricultural processes. The ground relief 150 may be transmitted to a further agricultural machine and/or stored in a computer program of a further agricultural machine. The terrain relief may be transmitted to a display device 210 (for example in a wireless and/or wired manner).

The data processing apparatus 30 additionally comprises and/or is signal-connected and/or is able to be signal-connected to the first controlling apparatus 26 and/or to the second controlling apparatus 28.

The detection apparatus 90 serves for detecting a travel speed and/or a travelled route, in particular per time unit.

In one exemplary embodiment, the data processing apparatus 30 is configured to calculate a travelled route, in particular per time unit, using a travel speed, and/or to calculate a terrain relief 150 using a travelled route, in particular per time unit, and using an inclination angle of the chassis 12, which changes or remains constant, in particular along the route.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

LIST OF REFERENCE NUMERALS

10 Agricultural machine
12 Chassis
14 Cab
16 Engine unit
18 Storage containers
20 Running wheel
22 Axle
22.1 Front axle
22.2 Rear axle
24 Distributor boom
26 First controlling apparatus
28 Second controlling apparatus
30 Data processing apparatus
35 Computer unit 50 First sensor arrangement
60 Second sensor arrangement
70 Third sensor arrangement
80 Fourth sensor arrangement
90 Detection apparatus
100 Position determining system
110 Data store
120 Reference point
150 Terrain relief
200 Planning system
210 Display device
FR Direction of travel
H Horizontal
EB Orientation of gravitational acceleration
H1 Minimum distance
H2 Chassis distance
H3 Relative distance
A1 Axle distance
A2 Second distance
A3 Third distance
A4 Reference distance
A5 Fifth distance
A6 Sixth distance
A7 Seventh distance
A8 Eighth distance
A10 Track width
A11 Eleventh distance
A12 Distributor boom width
X X-Axis
Y Y-Axis
Z Z-Axis
α Inclination angle in direction of travel
β Inclination angle transversely to direction of travel

What is claimed is:

1. An agricultural machine comprising:
a chassis which bears components of the agricultural machine;
a data processing apparatus;
a sensor unit for detecting an inclination angle of the chassis; and
a detection apparatus for detecting a travel speed and/or a travelled route;
wherein the data processing apparatus is configured to calculate a terrain relief using the travelled route and using an inclination angle of the chassis which changes or remains constant, wherein the agricultural machine comprises:
a distributor boom that is height-adjustable relative to the chassis and/or adjustable relative to the chassis in a rotational position thereof, wherein a first controlling apparatus is provided for controlling a vertical position and/or wherein a second controlling apparatus is provided for controlling a rotational position, wherein the data processing apparatus is configured to calculate at least one of the following:
controlling signals for the first controlling apparatus and/or the second controlling apparatus using the calculated terrain relief; and
a vertical position and/or a rotational position of the distributor boom relative to the chassis and/or relative to a ground surface using the calculated terrain relief.

2. The agricultural machine according to claim 1, wherein the sensor unit detects the inclination angle of the chassis relative to a reference plane.

3. The agricultural machine according to claim 2, wherein the reference plane has at least an orientation that corresponds to at least on of the following:
a horizontal and/or an artificial horizontal,
an orientation of gravitational acceleration,
an orientation which is at least substantially parallel to the horizontal, and/or
an orientation which is at least substantially parallel to the orientation of the gravitational acceleration.

4. The agricultural machine according to claim 1, wherein the inclination angle changes or remains constant along the route.

5. The agricultural machine according to claim 1, wherein the sensor unit has a first sensor arrangement that detects an inclination angle in a direction of travel.

6. The agricultural machine according to claim 1, wherein the sensor unit has a second sensor arrangement that detects an inclination angle transversely to a direction of travel.

7. The agricultural machine according to claim 1, wherein the travel speed or the travelled route are detected or calculated per time unit.

8. The agricultural machine according to claim 1, wherein the sensor unit includes one or more of a first sensor arrangement that detects an inclination angle of the chassis in a direction of travel and a second sensor arrangement that detects an inclination angle of the chassis transversely to a direction of travel, and wherein the first sensor arrangement and/or the second sensor arrangement comprises at least one of an inclinometer or an acceleration-compensated inclinometer.

9. The agricultural machine according to claim 1, wherein the sensor unit includes one or more of a first sensor arrangement that detects an inclination angle of the chassis in a direction of travel and a second sensor arrangement that detects an inclination angle of the chassis transversely to a direction of travel, and wherein the first sensor arrangement and/or the second sensor arrangement comprises at least one angular rate sensor and/or one accelerometer for detecting a rotational speed and/or a rotational acceleration of the chassis.

10. The agricultural machine according to claim 9, wherein the data processing apparatus is configured to determine by time integration of the rotational speed and/or by time integration of the rotational acceleration, an inclination angle of the chassis.

11. The agricultural machine according to claim 1, wherein this agricultural machine comprises a first axle and/or a second axle, wherein the first axle and/or the second axle in each case have at least two running wheels, wherein in each case at least one running wheel is arranged to the left and at least one running wheel is arranged to the right of the chassis, and wherein at least the running wheels of the first axle and/or the second axle are vertically movable relative to the chassis for defining a relative distance.

12. The agricultural machine according to claim 11, wherein the data processing apparatus is configured to calculate at least one of an inclination angle in a direction of travel, an inclination angle transverse to the direction of travel, or a terrain relief, by taking into account on or more of
a relative distance of the running wheels of the first axle relative to the chassis and a relative distance of the running wheels of the second axle relative to the chassis, or
a relative distance of the running wheels to the left relative to the chassis and a relative distance of the running wheels to the right relative to the chassis.

13. The agricultural machine according to claim 1, wherein the agricultural machine is one or more of an agricultural traction machine, a self-propelled working machine, or a towed working machine, and wherein the working machine comprises a distributor boom that is height-adjustable relative to the chassis and/or adjustable relative to the chassis in a rotational position thereof.

14. The agricultural machine according to claim 13, wherein the distributor boom comprises a spraying boom and forms a field sprayer or a fertilizer spreader.

15. The agricultural machine according to claim 1, wherein the first controlling apparatus and/or the second controlling apparatus are formed by one or more pneumatically, hydraulically, or electrically a ctuatable actuators.

16. The agricultural machine according to claim 15, wherein each of the actuators comprise one or more of single-acting cylinders, two opposingly operating single-acting cylinders, or one or more dual-acting cylinders.

17. The agricultural machine according to claim 1, wherein the data processing apparatus is configured to calculate a vertical position and/or a rotational position of the distributor boom relative to the chassis and/or relative to a ground surface using at least one of the following:
   a vehicle geometry of the agricultural machine, or
   a travelled route.

18. The agricultural machine according to claim 1, wherein the data processing apparatus is configured to calculate controlling signals for the first controlling apparatus and/or the second controlling apparatus using at least one of the following:
   a vehicle geometry of the agricultural machine, or
   a travelled route.

19. The agricultural machine according to claim 18, wherein the vehicle geometry is defined by one or more of a track width, an axle distance, a reference distance of a distributor boom from a reference point on the chassis, or a distributor boom width of the distributor boom.

20. The agricultural machine according to claim 1, wherein the data processing apparatus is configured to generate controlling signals for the first controlling apparatus and/or the second controlling apparatus using a minimum distance of the distributor boom relative to the ground surface, calculated on the basis of the terrain relief.

21. The agricultural machine according to claim 1, wherein the agricultural machine has a third sensor arrangement for detecting a chassis distance, which is present between the chassis and a ground surface.

22. The agricultural machine according to claim 21, wherein the third sensor arrangement is arranged upstream of the chassis.

23. The agricultural machine according to claim 1, wherein the detection apparatus is configured to detect a constant travel speed, an acceleration, and/or a deceleration of the agricultural machine, and wherein the data processing apparatus is configured to calculate a travelled route, using the constant speed, the acceleration, and/or the deceleration.

24. A method for operating an agricultural machine, the method comprising:
   providing an agricultural machine comprising a chassis which bears components of the agricultural machine, a data processing apparatus, a sensor unit for detecting an inclination angle of the chassis, and a detection apparatus for detecting a travel speed and/or a travelled route, wherein the agricultural machine further comprises a distributor boom that is height-adjustable relative to the chassis and/or adjustable relative to the chassis in a rotational position thereof, wherein a first controlling apparatus is provided for controlling a vertical position and/or wherein a second controlling apparatus is provided for controlling a rotational position;
   calculating, using the data processing apparatus, at least one of the following:
      controlling signals for the first controlling apparatus and/or the second controlling apparatus using the calculated terrain relief; and a vertical position and/or a rotational position of the distributor boom relative to the chassis and/or relative to a ground surface using the calculated terrain relief.

25. The method of claim 24, wherein the sensor unit detects the inclination angle relative to a reference plane.

26. The method of claim 24, wherein the travel route is calculated per unit of time.

* * * * *